United States Patent [19]

Stenne

[11] 4,271,201
[45] Jun. 2, 1981

[54] MANUFACTURE OF CHEESES

[75] Inventor: Pierre Stenne, Marigny, France

[73] Assignee: Societe d'Assistance Technique pour Produits Nestle S.A., Lausanne, Switzerland

[21] Appl. No.: 5,730

[22] Filed: Jan. 23, 1979

Related U.S. Application Data

[63] Continuation-in-part of Ser. No. 940,012, Sep. 6, 1978, abandoned, which is a continuation of Ser. No. 758,825, Jan. 12, 1977, abandoned.

[30] Foreign Application Priority Data

Feb. 4, 1976 [FR] France .................................. 76 03119

[51] Int. Cl.³ ........................ A23C 19/02; A23C 21/00
[52] U.S. Cl. ...................................... 426/40; 426/582; 426/583; 426/491
[58] Field of Search .................. 426/36, 40, 583, 582, 426/491

[56] References Cited

U.S. PATENT DOCUMENTS

| 2,507,480 | 5/1950 | McDonald et al. ................ 426/582 |
| 3,644,326 | 2/1972 | Pien ................................. 426/582 X |
| 3,899,596 | 8/1975 | Stenne .............................. 426/40 |

*Primary Examiner*—David M. Naff
*Attorney, Agent, or Firm*—Watson, Leavenworth, Kelton & Taggart

[57] ABSTRACT

Cheese is produced by a process wherein milk is subjected to partial ultrafiltration, heat denatured serum proteins are added to the milk before or after ultrafiltration, the milk is coagulated to form a curd wherein 1/4 to 1/2 of the total serum proteins contained in the curd are the added heat denatured proteins, and the curd is drained to produce curd containing a total amount of serum proteins substantially equal to the total serum protein content of the starting milk. The addition of heat denatured serum proteins overcomes a problem of alternation in the normal ripening cycle of cheeses produced from ultrafiltered milk containing an increased quantity of soluble serum proteins.

9 Claims, No Drawings

MANUFACTURE OF CHEESES

CROSS-REFERENCE TO RELATED APPLICATIONS

This application is a continuation-in-part of Application Ser. No. 940,012, filed Sept. 6, 1978, now abandoned, which in turn is a continuation of Application Ser. No. 758,825, filed Jan. 12, 1977, now abandoned.

This invention relates to a process for the production of cheeses.

More particularly the invention relates to the production of cheeses from ultrafiltered milks, for example by the process described in French Pat. No. 2,240,686. This process comprises treating a milk by ultrafiltration to obtain a liquid product which contains all or some of the protein constituents of the milk and of which the non-fat dry matter content amounts to at most 18% by weight. This liquid is subsequently subjected to a heat treatment to bring it to the coagulation temperature, and is then rennetted after having been inoculated with the appropriate ferments. A batch of the product is then introduced into a vertical chamber in which the rennetted liquid coagulates, the coagulated mass is displaced upwards under a uniform pressure distributed over the base of said mass and individual slabs of coagulum, which will each constitute a cheese, are cut at the top of the chamber once they project a certain distance therefrom.

The slabs of curd are preferably cut up and introduced into moulds where the cheeses drain and lose up to 70% by weight of serum. The cheeses obtained are not significantly different from traditional cheeses of the same type and show a considerable reduction in the standard weight deviation. However, the cheese yield is adversely affected by the loss of a considerable amount of the soluble proteins during draining.

In the process described in French Pat. No. 2,052,121, in which cheeses are prepared from an ultrafiltration retentate having a non-fat dry matter content of from 27 to 30% by weight, the soluble proteins are completely or almost completely retained in the retentate and it has been found that draining of the "intermediate" cheese is in practice minimal. As a result, the yield is improved because the soluble proteins, although not coagulated by the rennet, remain almost completely in the final cheese (Le Lait 1971, No. 508, page 523). However, this advantage is offset by a major disadvantage inherent in the physical characteristics of the cheeses obtained, because it has been found that these products differ considerably from traditional cheeses of the same type, in particular in regard to the ripening curve and texture of the cheeses.

It has been found that the presence of an increased quantity of soluble proteins in the composition of the intermediate cheese or, in other words, modification of the casein/serum protein ratio, is accompanied by a profound alteration in the normal ripening cycle of cheeses in the form of soft pastes. On the one hand, hydrolysis of the casein is accelerated and, on the other hand, the products of that hydrolysis, after solubilisation, are less concentrated and impart a fluid character to the product. In addition, the cheeses obtained by this process have a homogeneous cut without any cracks, which contrasts with the normal appearance of a traditional cheese, for example a camembert, which has a heterogeneous cut full of cracks and holes emanating from moulding or fermentation.

An object of the present invention is to obviate the disadvantages referred to above. More precisely, an object of the invention is to provide products which have the same properties as traditional cheeses of the same type whilst, at the same time, retaining the reduced standard weight deviations and the increased cheese yields afforded respectively by the two known processes referred to above.

The present invention provides a process for producing cheeses, in which a milk is treated by ultrafiltration to increase the relative proportion of proteins, the treated milk is rennetted and/or acidified and is then introduced into a chamber to form a curd from which the cheeses are prepared, wherein some of the soluble proteins of the initial milk are replaced by denatured serum proteins.

In practice, the soluble proteins are replaced by the addition of a certain quantity of denatured serum proteins to the milk before formation of the curd.

In one embodiment of the invention, the ultrafiltered and rennetted milk is introduced into at least one vertical chamber in which it coagulates and the coagulated mass is then displaced upwards under a uniform pressure applied to its base, after which individual slabs of the coagulum are cut at the top of the chamber, divided up into pieces and placed in draining moulds. In this embodiment, the process is distinguished by the fact that the soluble proteins present in the serum liberated during draining are replaced by denatured serum proteins so as to obtain a curd from which the ultimate cheeses are prepared having a total protein content substantially equal to that of the starting milk used.

The invention also relates to cheeses obtained by the process defined above. The invention further provides a cheese produced from ultrafiltered milk and containing substantially all the proteins of the initial milk, some of the serum proteins which the cheese contains before ripening being denatured.

Ultrafiltration is a process in which an emulsion such as milk moves continuously across a semi-permeable membrane film and transfers most of its water, soluble salts, and non-protein nitrogen to the film's outer surface while concentrating fat, protein, and insoluble (bound) salts along the inner surface. Although the ultrafiltration treatment may be carried out on whole milk, it is generally preferred to use a skimmed milk so as to avoid over-frequent blockage of the semi-permeable membranes. The solids-non-fat dry matter content of milk (defatted dry extract, referred to hereunder as "SNF") is equal to 9%. By means of ultrafiltration, the milk may be concentrated to a maximum SNF of from 27 to 30%. Of course, any concentration between 9% and 30% may also be obtained by ultrafiltration treatment.

More particularly, the ultrafiltration may be continued by circulating the milk through the semi-permeable membranes until the desired amount of casein, serum proteins and bound salts are retained, or alternatively, until the soluble components no longer pass through the semi-permeable membrane, at which point total ultrafiltration has been achieved. Due to polarization phenomena and viscosity problems that occur during ultrafiltration, total ultrafiltration corresponds to a SNF content of from 27 to 30% and is equivalent to the dry matter content needed for having a cheese in which no subsequent draining occurs.

Consequently, it is seen that a range exists between the extremes of no ultrafiltration which corresponds to a SNF content of 9% and total ultrafiltration which corresponds to a SNF content of from 27 to 30%. The ultrafiltration which may be carried out between these two extremes is commonly referred to as partial ultrafiltration. Tables I and II set forth hereinbelow demonstrate the relationship between SNF content, total volume remaining after any desired extent of ultrafiltration, and corresponding concentration factor. Table I sets forth these relationships in absolute quantities, i.e., grams of each constituent remaining in the volume of milk left after ultrafiltration. Table II, on the other hand, sets forth these very same relationships only in terms of concentration, i.e., grams/liter, for each constituent and for each respective UF concentration factor.

depend upon the desired results. As noted above, such ultrafiltration within the range of a concentration factor from 1 to 6 is considered partial ultrafiltration.

In addition to the SNF content, the extent of ultrafiltration will also effect the amount of subsequent draining. Thus, where no ultrafiltration is carried out total (traditional) draining takes place. In contrast, where total ultrafiltration takes place, substantially no subsequent draining is encountered. In between this range, where partial ultrafiltration is carried out, corresponding partial draining takes place. Hence, by choosing a certain ultrafiltration concentration factor, the amount of draining that subsequently takes place is automatically and inherently fixed by nature for a particular cheese that is being prepared. Other factors which may also affect the extent of draining include the manner in which the milk is coagulated, the manner in which the

TABLE I

| | | STARTING SKIMMED MILK (1 ×) | UF CONCENTRATION FACTOR | | | | | |
|---|---|---|---|---|---|---|---|---|
| | | | 1.5 × | 2 × | 3 × | 4 × | 5 × | 6 × |
| | TOTAL VOLUME | 1000 ml | 666 ml | 500 ml | 333 ml | 250 ml | 200 ml | 166 ml |
| CON- | CASEIN | 26.0 | 26.0 | 26.0 | 26.0 | 26.0 | 26.0 | 26.0 |
| STIT- | SERUM PROTEINS | 7.0 | 7.0 | 7.0 | 7.0 | 7.0 | 7.0 | 7.0 |
| UENTS | LACTOSE | 50.0 | 33.33 | 25.0 | 16.67 | 12.5 | 10.0 | 8.3 |
| (GRAMS) | FREE SALTS | 3.5 | 2.33 | 1.75 | 1.17 | .87 | .7 | .58 |
| | BOUND SALTS | 3.5 | 3.5 | 3.5 | 3.5 | 3.5 | 3.5 | 3.5 |
| | TOTAL (gms) | 90.0 | 72.16 | 63.25 | 54.34 | 49.87 | 47.20 | 45.38 |
| | APPROXIMATE SNF VALUE | 9% | 11% | 12.5% | 16% | 20% | 24% | 27% |

$$\left(\frac{\text{total grams of constituents}}{\text{wt. of total volume}}\right) \times 100\%$$

↑ NO UF  |————— PARTIAL UF —————|  ↑ TOTAL UF

TABLE II

| | | STARTING SKIMMED MILK (1 ×) | UF CONCENTRATION FACTOR | | | | | |
|---|---|---|---|---|---|---|---|---|
| | | | 1.5 × | 2 × | 3 × | 4 × | 5 × | 6 × |
| | TOTAL VOLUME | 1000 ml | 666 ml | 500 ml | 333 ml | 250 ml | 200 ml | 166 ml |
| CONSTIT- | CASEIN | 26.0 | 39.0 | 52.0 | 78.0 | 104.0 | 130.0 | 156.0 |
| UENT | SERUM PROTEINS | 7.0 | 10.5 | 14.0 | 21.0 | 28.0 | 35.0 | 42.0 |
| CONCENT- | LACTOSE | 50.0 | 50.0 | 50.0 | 50.0 | 50.0 | 50.0 | 50.0 |
| RATION | FREE SALTS | 3.5 | 3.5 | 3.5 | 3.5 | 3.5 | 3.5 | 3.5 |
| $\left(\frac{\text{grams}}{\text{liter}}\right)$ | BOUND SALTS | 3.5 | 5.25 | 7.0 | 10.5 | 14.0 | 17.5 | 21.0 |
| | TOTAL CONCENTRATION (grams/liter) | 90.0 | 108.25 | 126.5 | 163.0 | 199.5 | 236.0 | 272.5 |
| | APPROXIMATE SNF VALUE | 9% | 11% | 12.5% | 16% | 20% | 24% | 27% |

$$\left(\frac{\text{concentration}}{\text{wt. of 1 liter}}\right) \times 100\%$$

↑ NO UF  |————— PARTIAL UF —————|  ↑ TOTAL UF

As can be seen, for example, from Table I above, the amount (considered in absolute terms) of casein, serum proteins, and bound salts remain constant as a result of the ultrafiltration, while the lactose and free salts (also considered in absolute quantities) correspondingly decrease as the concentration factor increases. It is to be noted that although both Tables set forth concentration factors in multiples of one (except for the concentration factor of 1.5), it is, of course, understood that any factor in the range of from 1 to 6 may be employed and will curd is cut, the temperature at which rennet is added, the degree of fermentation and the like.

Proportionate to the amount of partial draining that takes place, is the amount of soluble proteins that are eliminated. For example, if partial draining occurs such that only one-third of the amount of draining that normally takes place with conventional (total) draining is present, then only one-third of the starting soluble proteins present will be eliminated in contrast to total elimination of the soluble proteins with conventional draining.

A milk ultrafiltered to a SNF of 15% or to a total dry extract (or "TS" for total solids) of approximately 18% may be compared with a normal cheese-grade milk because the curd which it forms is a curd which, once slabbed and drained, is capable of recombining. On the other hand, experience has shown that a curd obtained from an ultrafiltered and then concentrated milk does not recombine on its own. Accordingly, a curd such as this cannot be slabbed and subjected to normal draining. However, it is pointed out that a curd obtained from a milk ultrafiltered to the maximum concentration (27 to 30% SNF) releases a small quantity of serum without slabbing.

In one particular embodiment of the process according to the invention, a milk is ultrafiltered to a SNF of from 12 to 15% so as to allow the preparation of a "classical" curd, i.e., a curd capable of recombining after slabbing and draining. A curd such as this may be used for the production of cheeses in the form of soft pastes, such as camembert for example.

The proteins of the serum are soluble proteins which co-exist with casein in the milk and which are not coagulated by the rennet. They are normally recovered from the wheys produced during the cheese-making process in which they are present in concentrations of the order of 6 to 7 g per liter. The denaturing or insolubilisation of these proteins may be obtained by prolonged heating and acidification to pH 4.6 of the whey. They are separated by draining in bags or centrifuging, which enables a deproteinised serum and a suspension of serum proteins to be recovered. This suspension of denatured serum proteins has a protein content of approximately 19% by weight. This content may be adjusted as required by concentration or by dilution. The proteins may also be separated from the serum by ultrafiltration preceded or followed by flocculation under heat with or without acidification. It is preferred to keep the denatured proteins in the form of a suspension rather than in dry form on account of the difficulties which their subsequent rehydration may involve.

The replacement of some of the soluble proteins by denatured serum proteins is preferably obtained by adding a certain quantity of a suspension of denatured serum proteins to the milk used before formation of the curd. This addition may be made before, during or after ultrafiltration of the initial milk, i.e., to the starting milk with subsequent ultrafiltration of the mixture, to the retentate during ultrafiltration or to the retentate obtained after ultrafiltration is over.

The quantities in which the denatured serum proteins are added may unexpectedly vary within a wide range. Thus, it was readily possible to produce cheeses from curds, which, before draining, contained 30 parts of total serum proteins (soluble form and denatured form) to 50 parts of casein, i.e., 37.5% of serum proteins relative to the total proteins. Curds containing as many denatured serum proteins as soluble serum proteins were also prepared and, after draining, gave cheeses containing a preponderant proportion of serum proteins present in denatured form as a result of entrainment of the soluble proteins by the exuded serum. It is preferred to prepare cheeses from curd which, before draining, contains from 15 to 25 parts of total serum proteins to 50 parts of casein. With particular preference, from $\frac{1}{4}$ to $\frac{1}{2}$ of these total serum proteins of the curd are denatured serum proteins before draining. More particularly, the curd can contain 25 to 50 parts by weight of denatured serum proteins per 50 parts by weight of non-denatured serum proteins before draining.

Transformation of the retentate enriched by the addition of denatured serum proteins into curd and transformation of the curd into cheese are carried out traditionally or even as described in the above-mentioned French patents. Thus, lactic ferments are generally added to the retentate, followed by rennetting either at ambient temperature or at a temperature of from 25° C. to 50° C., depending upon the characteristics of the cheese which it is desired to obtain. This retentate is coagulated and the curd obtained is cut into portions which, if desired and depending upon the SNF of the curd, are slabbed to drain the whey. The curd is then moulded and subjected to the usual finishing operations involved in the production of cheese (maturing, ripening, etc.). In general, fats are also added to the retentate before coagulation so as to obtain cheeses containing from 40 to 60% by weight of fats, based on the total dry matter content.

The whey exuded during conversion of the retentate into cheese contains at least some of the soluble serum proteins of the starting milk. This is an additional advantage of the process according to the invention insofar as it is possible to recover the proteins from this whey, to denature them and to use the denatured serum proteins in a subsequent production cycle.

In one preferred embodiment of the process according to the invention, a milk is ultrafiltered to obtain a retentate having a SNF of from 12 to 15%, advantageously 14%. A suspension of denatured serum proteins having a SNF of from 12 to 18% is added to this retentate in a quantity of from 0.10 to 0.25 volume to 1 volume of retentate. Fats are added to the mixture followed, at a temperature of approximately 35° C., by introduction of the lactic ferments and then the rennet. The product obtained is advantageously poured into a vertical chamber where the curd is formed (in approximately 20 minutes). The curd is then pushed upwards and cut into slabs as it emerges from the chamber. The slabs of curd are broken up and then moulded. The serum exuded is recovered for recycling the serum proteins which it contains. Production of the cheese is completed in the usual way.

In another preferred embodiment, the suspension of denatured serum proteins is added to the milk before ultrafiltration in a quantity of from 0.06 to 0.15 volume of milk of serum proteins to 1 volume of milk.

The process according to the invention is illustrated by the following Examples, in which the ratios and percentages quoted are by weight.

EXAMPLE 1

Preparation of denatured serum proteins 100 l of whey obtained during the production of camembert (pH 6.3) are preheated to 95° C., followed by the addition of 0.260 l of pure lactic acid to adjust the pH to 4.6. The acidified whey is then kept at 90°–95° C. for 30 minutes until a heterogeneous liquid product is obtained. After cooling, the operation known as "draining in bags" is carried out, in other words the liquid product is poured into bags of Tergal cloth from which a clear homogeneous product is expressed. This clear product, which is a deproteinised serum, is put on one side and a whitish opaque product, namely a suspension of denatured serum proteins, is recovered in the bags. This suspension, which has a dry matter content of the order of 18% by weight, is smoothed and then homogenised. Its concentration is standardised to 14% by the addition of permeate.

Preparation of the retentate

The ultrafiltration treatment is carried out in a module comprising, in series, 10 ultrafiltration sub-assemblies, each sub-assembly being formed by five porous plates arranged parallel to one another and supporting on their two surfaces a semi-permeable membrane with a surface area of 0.1 m². This ultrafiltration module is manufactured by the Phone-Poulenc Company of Paris and the membranes, which have a total surface area of 10 m², bear the name "type Iris 3069".

A skimmed milk with a SNF of 8.8% (27 g/l of casein, 6.5 g/l of soluble serum proteins, 48 g/l of lactose and 6.5 g/l of salts) is introduced into the ultrafiltration module at a rate of 170 l/minute, which enables suitable turbulence conditions to be maintained, and is recycled into this apparatus through a buffer reservoir. After 2.5 hours operation, 141 liters of an ultrafiltered milk of retentate with a SNF of 14% (70 g/l of casein, 17 g/l of soluble serum proteins, 48 g/l of lactose and 5 g/l of salts) are recovered.

Preparation of the curd

A suspension of denatured serum proteins and a retentate of the types described above are mixed in a quantity of 0.17 volume of a suspension of denatured serum proteins to 1 volume of retentate. This mixture contains, for 70 parts of casein, 17 parts of non-denatured soluble serum proteins and 8.5 parts of denatured serum proteins (25.5 parts of total serum proteins). 2.5 liters of a cream containing 410 g of fats per liter are added to 14.1 liters of the mixture obtained which is then heated to 35° C. in a plate-type reheater followed, finally, by the addition of 320 cc of ferment consisting of an association of *Streptococcus lactis, Streptococcus cremonis, Leuconostoc citrovorum* and *Streptococcus diacetylactis*, and 3.2 cc of a rennet with a strength of 1/10000. After thorough mixing, the whole is poured into a vertical cylindrical chamber with an internal diameter of 14.4 cm and a useful height of 101 cm where it is left to harden for 20 minutes.

Conversion of the curd into cheese

The curd obtained is then pushed towards the top of the vertical chamber under a uniform pressure applied to the base of the curd. On leaving the chamber, the curd is cut into round slabs by means of a reciprocating blade. The pressure is applied in such a way that, for an interval of 10 seconds between each cut, a round slab with a depth of 5.5 cm, corresponding to a volume of 900 ml, is obtained, the chamber thus supplying a total of 18 round slabs. Each slab is deposited onto a conveyor of the rolling carpet type and is then cut up into pieces measuring approximately 3 cm × 3 cm by means of an assembly of 4 blades successively in the direction of travel of the rolling carpet and then in a perpendicular direction. Thereafter moulding is carried out: each size-reduced round slab is then introduced into a hopper below which a mould is arranged. Draining takes from 18 to 22 hours, during which period the curd recombines. The curd obtained after draining contains, for 70 parts of casein, 8.5 parts of non-denatured soluble serum proteins and 8.5 parts of denatured serum proteins. It has a fats content of 42% by weight, based on the dry matter content, the TS of the curd amounting to approximately 39%.

8 liters of whey containing 1.7% of soluble serum proteins are recovered in this way. This whey will be recycled and used for the production of denatured serum proteins. These conditions correspond to a saving of approximately 17% of skimmed milk. Treatment of the recombined curd to form cheese is carried out in the usual way. The cheese obtained is camembert which is indistinguishable from a traditional camembert both from the point of view of texture and organoleptic qualities and from the point of view of keeping properties.

EXAMPLE 2

The production cycle described in Example 1 is repeated using the crude suspension of denatured serum proteins with a dry matter content of 18%. This suspension of denatured serum proteins is used to prepare the same mixture of 70 parts of casein, 17 parts of non-denatured soluble serum proteins and 8.5 parts of denatured serum proteins. To this end, this product is added to the retentate with a SNF of 14% in a quantity of 0.13 volume per volume of retentate.

Production of the cheese is completed in exactly the same way.

EXAMPLE 3

This Example differs from the preceding Examples in regard to preparation of the retentate and the curd.

A liquid mixture containing 0.11 volume of the suspension of denatured serum proteins of Example 1 and 1 volume of skimmed milk with a SNF of 9% is prepared and then ultrafiltered in an ABCOR ultrafiltration module, type UF 44 S, containing 20 membranes of cellulose acetate each with a surface area of 0.2 m² rolled up inside porous cylindrical supports, the 20 membranes being distributed into two groups of 10 membranes fed in parallel.

After 2.5 hours operation, an ultrafiltered mixture with SNF of 14% is recovered, containinig 17 parts of non-denatured soluble serum proteins and 8.5 parts of denatured serum proteins for 70 parts of casein. Treatment of this mixture in the same way as in Example 1 (addition of fats, rennetting, coagulation, etc.) gives camemberts which are indistinguishable from traditional camemberts.

I claim:

1. A process for treating curd in preparation for producing cheeses comprising:
   (a) subjecting a milk having a total serum protein content to partial ultrafiltration wherein before, during, or after this ultrafiltration step, heat denatured serum proteins are added to the milk;
   (b) treating the partially ultrafiltered milk with rennet and/or acid;
   (c) coagulating the rennetted and/or acidified milk to form a curd containing 15 to 30 parts of total serum proteins to 50 parts of casein wherein from $\frac{1}{4}$ to $\frac{1}{2}$ of the total serum proteins now contained in the curd are said heat denatured serum proteins; and
   (d) draining the curd to remove whey therefrom, said whey containing soluble proteins therein wherein the amount of total serum protein contained in the curd is substantially equal to the total serum protein content of the starting milk.

2. A process as claimed in claim 1, wherein the denatured serum proteins are added in the form of a suspension of proteins with a protein content of from 12 to 18% by weight.

3. A process as claimed in claim 1, wherein the denatured serum proteins added to the milk before ultrafiltration thereof are added in the form of a suspension of denatured proteins which is added in a quantity of 0.06 to 0.15 volume per volume of milk to be ultrafiltered.

4. A process as claimed in claim 1, wherein the denatured serum proteins are added to the ultrafiltered milk in the form of a suspension of denatured proteins which is added in a quantity of from 0.10 to 0.25 volume per volume of ultrafiltered milk.

5. A process for treating curd in the preparation of cheeses comprising:
  (a) subjecting a milk having a total serum protein content to partial ultrafiltration wherein before, during or after this ultrafiltration step, heat denatured serum proteins are added to the milk;
  (b) treating the ultrafiltered milk with rennet and/or acid;
  (c) introducing the partially ultrafiltered rennetted and/or acidified milk into at least one vertical chamber;
  (d) coagulating the rennetted and/or acidified milk to form a curd containing 15 to 30 parts of total serum proteins to 50 parts of casein from ¼ to ½ of the total serum proteins now contained in the curd are said heat denatured serum proteins;
  (e) pushing the coagulated mass upwards under the effect of a uniform pressure applied to its base;
  (f) cutting individual slabs of the coagulated mass at the top of the chamber;
  (g) draining the coagulated mass by breaking the slab into pieces and introducing the pieces into draining moulds to remove whey from the coagulated curd mass wherein the amount of total serum protein contained in the drained curd is substantially equal to the total serum protein content of the starting milk.

6. A process as claimed in claim 5, wherein the serum produced during draining is collected, the soluble proteins are coagulated by heating and are then added to the milk before formation of the curd.

7. A process as claimed in claim 5, wherein a quantity of denatured serum proteins is added to the milk to produce a curd which, before draining, has a content of denatured serum proteins of from 25 to 50 parts by weight per 50 parts by weight of non-denatured serum proteins.

8. A cheese when produced by a process as claimed in claim 1.

9. A cheese when produced by a process as claimed in claim 5.

* * * * *

UNITED STATES PATENT AND TRADEMARK OFFICE
CERTIFICATE OF CORRECTION

PATENT NO. : 4,271,201
DATED : June 2, 1981
INVENTOR(S) : Pierre Stenne

It is certified that error appears in the above—identified patent and that said Letters Patent is hereby corrected as shown below:

Col. 7, line 13, "Phone-Poulenc" should read --Rhone-Poulenc--.

Signed and Sealed this

Twenty-fifth Day of August 1981

[SEAL]

Attest:

GERALD J. MOSSINGHOFF

Attesting Officer

Commissioner of Patents and Trademarks